United States Patent
Choi et al.

(10) Patent No.: US 6,252,642 B1
(45) Date of Patent: Jun. 26, 2001

(54) METHOD FOR ALIGNING POLYMER FILM AND METHOD FOR ALIGNING LIQUID CRYSTAL BY USING POLYMER ALIGNED-FILM

(75) Inventors: Sang Un Choi, Ich'on; Tae Kwon Kim, Songnam, both of (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/104,756

(22) Filed: Jun. 25, 1998

(30) Foreign Application Priority Data

Jun. 30, 1997 (KR) .................................................. 97-30385

(51) Int. Cl.[7] ........................... G02F 1/1337; G02F 1/13; C09K 19/00
(52) U.S. Cl. ................................. 349/124; 349/187; 428/1
(58) Field of Search ...................... 349/123, 124, 349/127, 187, 98; 428/1

(56) References Cited

U.S. PATENT DOCUMENTS

| | | | |
|---|---|---|---|
| 5,032,009 | * 7/1991 | Gibbons et al. | 349/124 |
| 5,438,421 | * 8/1995 | Sugawara et al. | 349/124 |
| 5,731,405 | * 3/1998 | Gibbons et al. | 428/1 |
| 5,889,571 | * 3/1999 | Kim et al. | 349/124 |

FOREIGN PATENT DOCUMENTS 6294959   10/1994   (JP) .

* cited by examiner

*Primary Examiner*—Toan Ton
(74) *Attorney, Agent, or Firm*—Selitto, Behr & Kim

(57) ABSTRACT

The arrangement of molecules of an optical activity compound such as polymer including azo-dye is changed by the polarization state of a pump beam applied to the polymer. The polymer is polyvinyl alcohol including methyl orange as azo-dye. The anisotropy of the molecular arrangement of the azo-dye is induced by the polarized incident beam and then the liquid crystal cell is made. Thereafter, the liquid crystal is inserted to the cell, aligning the liquid crystal. As the polarization of the pump beam changes from the linear polarization to the circular polarization, molecules of the methyl orange are exponentially increased at an axis parallel to the propagation direction of the pump beam and the molecules of the methyl orange are exponentially decreased at an axis vertical to the propagation direction of the pump beam. The pretilt angle of the liquid crystal is exponentially increased as an electric field ratio of the major axis to that of the minor axis in the pump beam approaches 1, that is a circular polarization.

15 Claims, 7 Drawing Sheets

METHOD FOR ALIGNING POLYMER FILM AND METHOD FOR ALIGNING LIQUID CRYSTAL BY USING POLYMER ALIGNED-FILM

BACKGROUND OF THE INVENTION

1. Field of the Invention

The present invention relates to a technique of optical alignment and more particularly a technique for aligning a polymer film, a method for aligning a liquid crystal with a controllable pretilt angle by using the polymer aligned-film and a liquid crystal display(LCD) employing the above techniques.

2. Related Art

A flat panel display is an important device in a television having a small size and a large scale screen and a portable terminal. Specially, an LCD is widely used as information display device in view of low addressing voltage, high contrast ratio, cheap cost, high reliability to the solar light and good interface to an integrated circuit.

So as to manufacture the LCD having an uniform brightness and high contrast ratio, the liquid crystal inserted between a pair of substrates in the LCD should be arranged in one direction. Generally, alignment films are formed on the opposite surfaces of a upper substrate and a lower substrate, thereby aligning the liquid crystal in one direction.

A general method for aligning the liquid crystal molecules is a surface treatment, specifically rubbing. A polyimide resin is coated on a surface of the substrate and then rubbed with a fabric, thereby forming a straight groove. The liquid crystal is aligned along the groove.

However, since rubbing is performed after forming the polyimide on the glass substrate having a color filter or a thin film transistor(TFT) array, the color filter or the TFT array beneath the substrate can be subjected to mechanical or electrical damage. Accordingly, reproduction of the process is not good. Also, the LCD manufactured by the rubbing method has a narrow viewing angle. In order to solve the narrow viewing angle, there is a technique for forming multi-domain. The process for forming the multi-domain using the rubbing method is complicated.

In the LCD, by using the rubbing method, it is not easy to control a pretilt angle of the liquid crystal which is an important factor for the response time and the contrast ratio of the LCD. Therefore, recently, a method for adjusting the pretilt angle, without rubbing, has been actively studied.

SUMMARY OF THE INVENTION

Accordingly, an aim of the present invention is to optically align a polymer without a rubbing method.

Another aim of the present invention is to control a pretilt angle of a liquid crystal without the rubbing method.

Still another aim of the present invention is to provide a method for optically aligning an alignment film having a good reproduction.

In order to realize a spirit of the present invention, a liquid crystal display has a first substrate, a second substrate opposite the first substrate, a high molecular thin film including an azo-dye and formed on an opposite surface of the first substrate, an alignment film formed on an opposite surface of the second substrate, and a liquid crystal layer formed between the polymer film and the alignment film. Here, the polymer film is a polyvinyl alcohol including a methyl orange as azo-dye.

Referring to a method for forming the above mentioned polymer film as an alignment film, first, a substrate is provided. The polymer film including azo-dye is formed on the substrate. A pump beam having a predetermined polarization state is applied to the polymer film, thereby modifying an arrangement of molecules of the polymer. The polymer film is a polyvinyl alcohol including a methyl orange as azo-dye. The predetermined polarization state is one of a circular polarization, an ellipse polarization and a linear polarization. As to the arrangement of the polymer film, a number of the polymer film arranged in a first direction parallel to a propagation direction of the pump beam and a number of the polymer film arranged in a second direction perpendicular to the propagation direction of the pump beam are controlled according to an intensity scale of electric fields of major axis and minor axis of the pump beam. That is, as a ratio of the electric field scale of the major axis to that of the minor axis approaches 1, the number of the polymer film arranged in the first direction is exponetially increased. Also, as a ratio of the electric field scale of the major axis and that of the minor axis approaches 1, the number of the polymer film arranged in the second direction is exponetially decreased. Further, a birefringence of the polymer film is exponentially increased as a ratio of the electric field scale of the major axis and that of the minor axis approaches 1.

Referring to a method for aligning a liquid crystal with an easily controllable pretilt angle, first, a first substrate and a second substrate opposite the first substrate are provided. The polymer film including azo-dye is formed on an opposite surface of the first substrate. A pump beam having a predetermined polarization state is applied to the polymer film, modifying an arrangement of molecules of the polymer film. A liquid crystal layer is formed between the first substrate and the second substrate. Here, the polymer film is a polyvinyl alcohol including a methyl orange as azo-dye. The predetermined polarization state is one of a circular polarization, an ellipse polarization and a linear polarization. A pretilt angle in a liquid crystal of the liquid crystal layer is controlled according to the polarization state of the pump beam. In detail, a pretilt angle in a liquid crystal is exponentially increased as a ratio of the electric field scale of the major axis and that of the minor axis approaches 1. Also, a pretilt angle in a liquid crystal of the liquid crystal layer is exponentially increased as the molecular number of the polymer arranged in the first direction is increased. Further, a pretilt angle in a liquid crystal of the liquid crystal layer is exponentially decreased as the molecular number of the polymer arranged in the second direction is increased. A pretilt angle in a liquid crystal of the liquid crystal layer is increased as a birefringence of the polymer film is increased.

As described above, the arrangement of molecules of the polymer is controlled and a pretilt angle of molecules of the liquid crystal is easily adjusted, by using polyvinyl alcohol as the polymer including methyl orange as azo-dye.

BRIEF DESCRIPTION OF THE ATTACHED DRAWINGS

DESCRIPTION OF THE PRESENT INVENTION

In the present invention, not rubbing but using a polymer including azo-dye and the polarized pump beam, an anisotropy of the arrangement of the polymer including azo-dye is induced and then a liquid crystal cell is formed. Thereafter, a liquid crystal is injected to the liquid crystal cell, thereby aligning the liquid crystal.

A polarized state of the pump beam applied to such polymer aligned-film determines an arrangement of the polymer aligned-film, which controls a pretilt angle of a liquid crystal of a liquid crystal cell.

Figure 1:
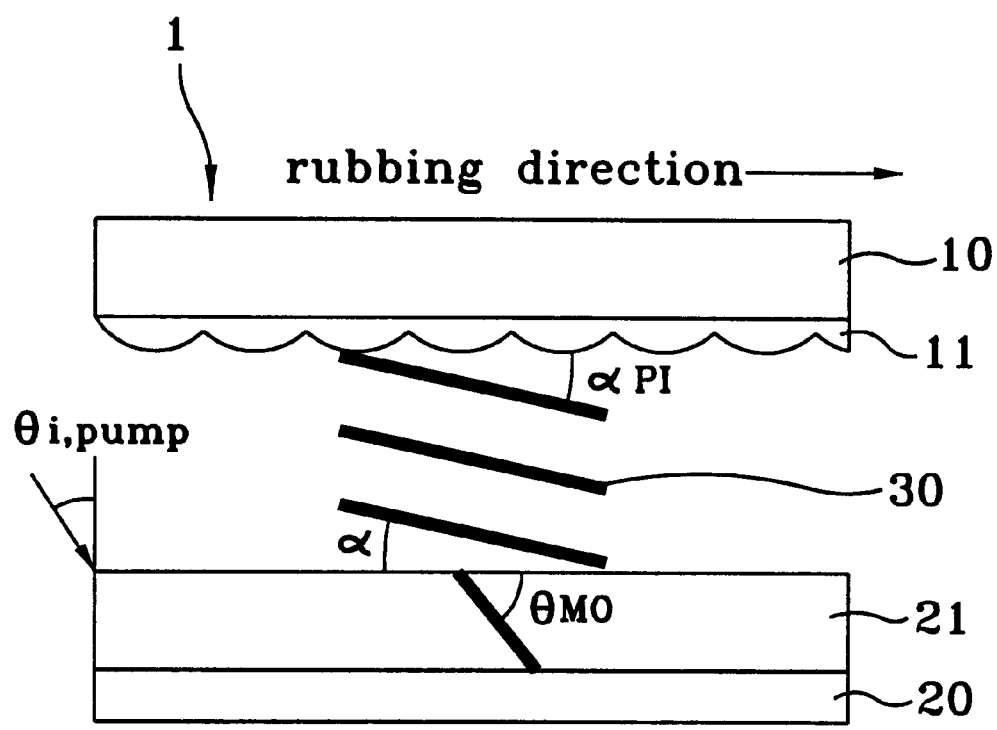
FIG. 1 is a cross sectional view of a liquid crystal cell illustrating an optical alignment by a polarized pump beam according to the present invention.

FIG. 1 is a cross sectional view of a liquid crystal cell illustrating an optical alignment by a polarized pump beam according to the present invention.

The liquid crystal cell 1 has an upper substrate 10 and a lower substrate 20. An alignment film 21 made of polymer including dye is provided on the lower substrate 20 while an alignment film 11 made of polyimide is coated on the upper substrate 10. The dye contained in the polymer alignment film 21 is methyl orange showing optical anisotropy feature and polyvinyl alcohol is used as a matrix.

In the liquid crystal cell of FIG. 1, the alignment film 11 is aligned so as to have a selected pretilt angle by the rubbing method and the polymer alignment film on the lower substrate 21 is pumped by the polarized light and aligned so as to have a selected pretilt angle, before bonding the upper substrate and the lower substrate.

A pretilt angle /α of the liquid crystal cell in FIG. 1 is measured by a crystal rotation method and is represented as the following equation.

$$\overline{\alpha} = \frac{\alpha_{PI} + \alpha}{2} = \frac{\theta_x}{n_e + n_o}$$

Wherein $\alpha_{PI}$ and $\alpha$ are respectively a pretilt angle of liquid crystal near the polyimide alignment film 11 and the polymer alignment film 21, $\theta_x$ is a symmetrical angle of a transmittance curve of the liquid crystal cell and $n_e$ and $n_o$ are respectively refraction indexes of the extraordinary wave and the ordinary wave.

The pretilt angle α of the liquid crystal near the polymer alignment film 21 is calculated from the above equation.

If the circularly polarized pump beam is slantly applied to the liquid crystal cell in FIG. 1 with respect to the substrate, the methyl orange molecules are arranged along the propagation of the light. After the manufacture of the cell, the liquid crystal is inserted and is slantly aligned.

Figure 2A:
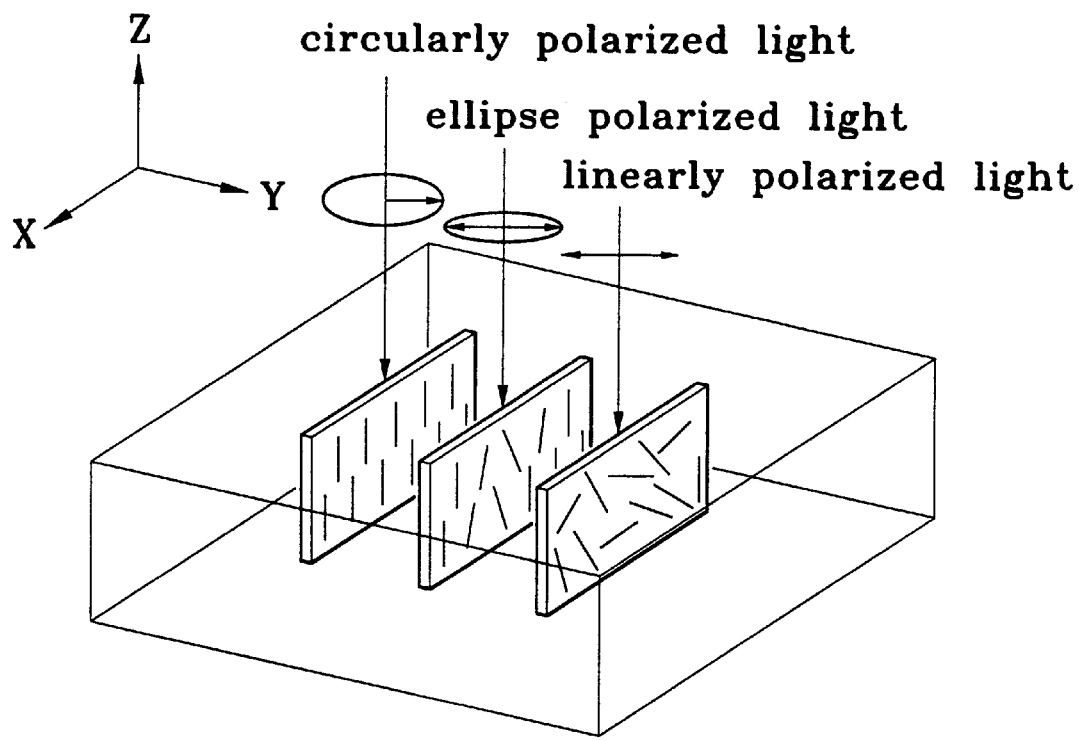
FIG. 2A and FIG. 2B are views showing an arrangement of methyl orange molecules according to the polarized state of the pump beam.

First, the arrangement of the methyl orange molecules will be studied according to the polarized state of the incident light. As shown in FIG. 2A, a circular polarized light, an ellipse polarized light and a linear polarized light are used as the pump beam. If the polarized state of the pump beam shifts from the circular polarization to the linear polarization via the ellipse polarization, the methyl orange molecules in the methyl orange/polyvinyl alcohol switch from an arrangement along the Z axis to a random arrangement with respect to the Z axis. As a result, the arrangement of methyl orange molecules under the linear polarization is isotropy on the XZ plane. That is, as shown in FIG. 2A, in case where the Y-axis linear polarized light is applied, the methyl orange molecules are arranged on the XZ plane. And, in case where the X-axis linear polarized light is applied, the methyl orange molecules are arranged on the YZ plane. Thus, in case where the circularly polarized light, having X-aixs and Y-axis polarized light each having same amplitude, is applied, the methyl orange molecules of the methyl orange/polyvinyl alcohol are arranged in the Z-axis. If the ellipse polarized light is applied, the arrangement of the methyl orange molecules is between the case of the circularly polarized light and the case of the linearly polarized light, i.e., not complete isotropy.

Figure 2B:
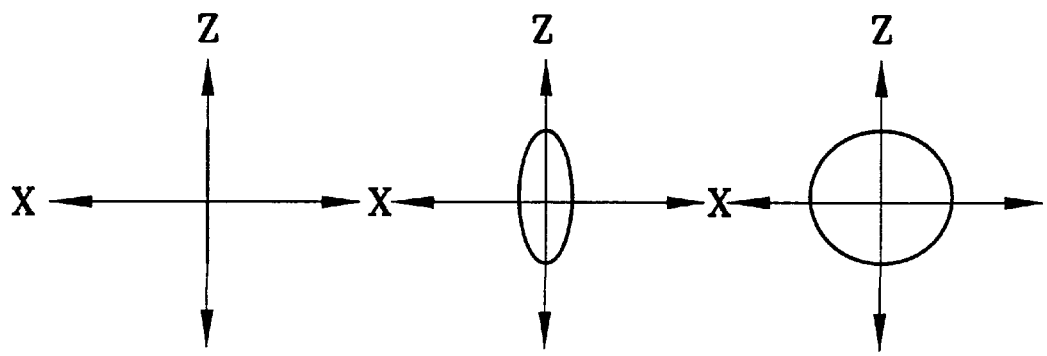

FIG. 2B shows a distribution of the methyl orange molecules on the X-Z plane wherein the mass center of all the methyl orange molecules is positioned at an origin. The circularly polarized light makes the methyl orange molecules arranged along the propagation of the light. By the ellipse polarized light, the methyl orange molecules are distributed in an ellipse shape while by the linearly polarized light the molecules has circle-form distribution. We can recognize from the above facts that the arrangement of the methyl orange molecules is varied in accordance with the polarized state of the pump beam.

Figure 3:
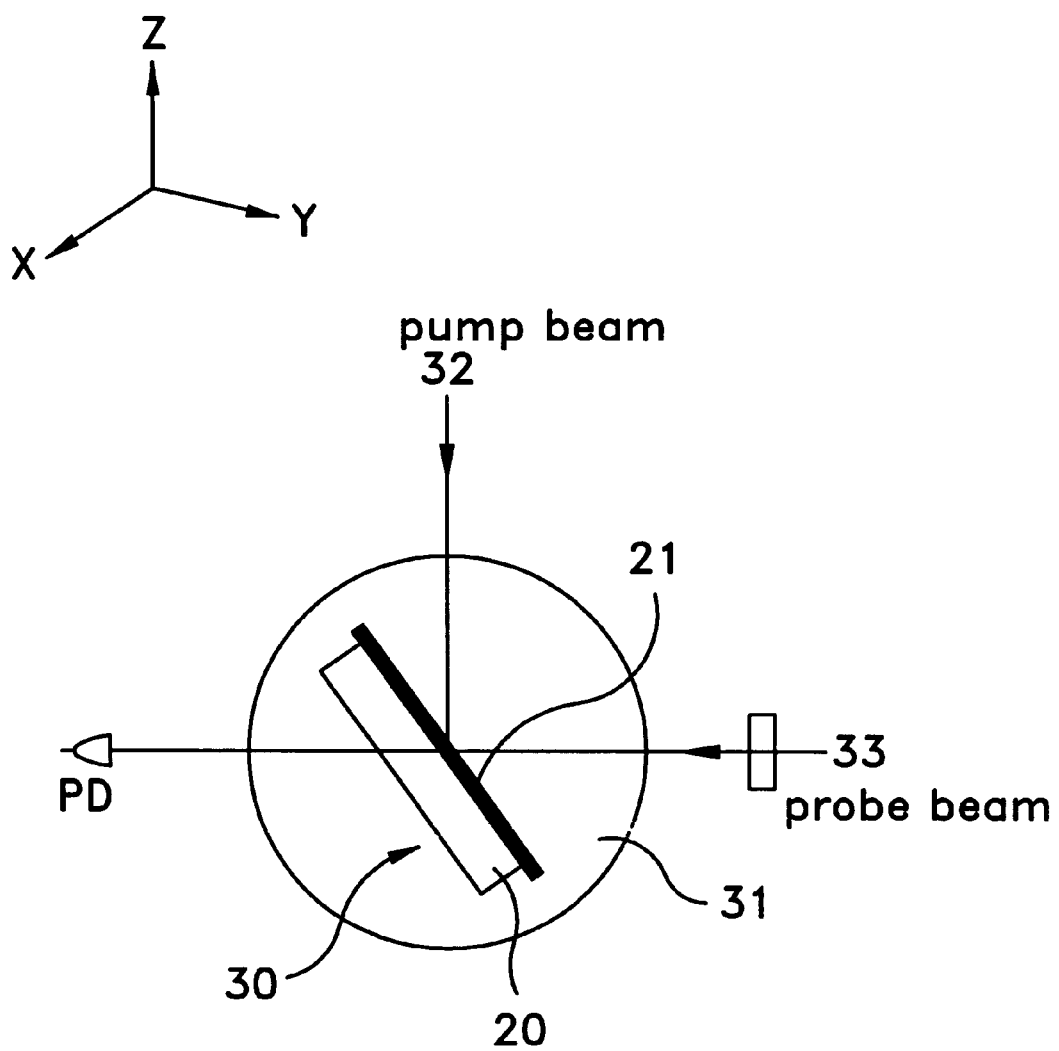
FIG. 3 is an apparatus for measuring the number of methyl orange molecules arranged in a parallel direction to the propagation of the pump beam and arranged in a perpendicular direction to that of the pump beam.

FIG. 3 roughly illustrates an experimental apparatus for showing the controllable arrangement of methyl orange molecules according to the polarized state of the light applied to the polymer including the methyl orange.

A sample 30 having a substrate 20 and an alignment film 21 made of polyvinyl alcohol including methyl orange is dipped in hexane solution with 1.37 refraction index, in order to match the alignment film to the hexane solution. After pumping for one hour, are measured the transmittance $T_∥$ in case where the propagation direction of the pump beam 32 is parallel to a polarization direction of a probe beam 33 and the transmittance $T⊥$ in case where the propagation direction of the pump beam 32 is perpendicular to a polarization direction of a probe beam 33. At this time, an incident angle of the pump beam is fixed at 60° and the propagation direction of the probe beam 33 is vertical to the propagation direction of the pump beam 32.

Since the intensity of the probe beam 33 is very small, 0.165 mW/cm², we can consider that an absorption of the light is proportional to the number of the methyl orange molecules. A relationship between the transmittance T of the probe beam and the number N of the methyl orange molecules is read as follows:

$$N \propto 1 - T$$

If the number of the methyl orange molecules arranged parallel to the propagation of the pump beam is $N_{\parallel}$ and a number of the methyl orange molecules arranged vertical to the propagation of the pump beam is $N_{\perp}$, the number ratio of the methyl orange molecules is represented as the following equations:

$$n_{\parallel} = \frac{N_{\parallel}}{N_{\parallel} + N_{\perp}} = \frac{1 - T_{\parallel}}{2 - T_{\parallel} - T_{\perp}}$$

$$n_{\perp} = \frac{N_{\perp}}{n_{\parallel} + n_{\perp}} = \frac{1 - T_{\perp}}{2 - T_{\parallel} - T_{\perp}}$$

Wherein, $n_{\parallel}$ is a number ratio of the methyl orange molecules arranged parallel to the propagation of the pump beam, and $n_{\perp}$ is a number ratio of the methyl orange molecules arranged vertical to the propagation of the pump beam.

In addition, assuming that a birefringence $\Delta n$ of the polymer film is proportional to the number of the methyl orange molecules, the birefringence $\Delta n$ is written below:

$$\Delta n = N_{\parallel} - N_{\perp} = N(n_{\parallel} - n_{\perp})$$

Here, N is total number of the methyl orange molecules, $N_{\parallel} + N_{\perp}$.

Figure 4A:
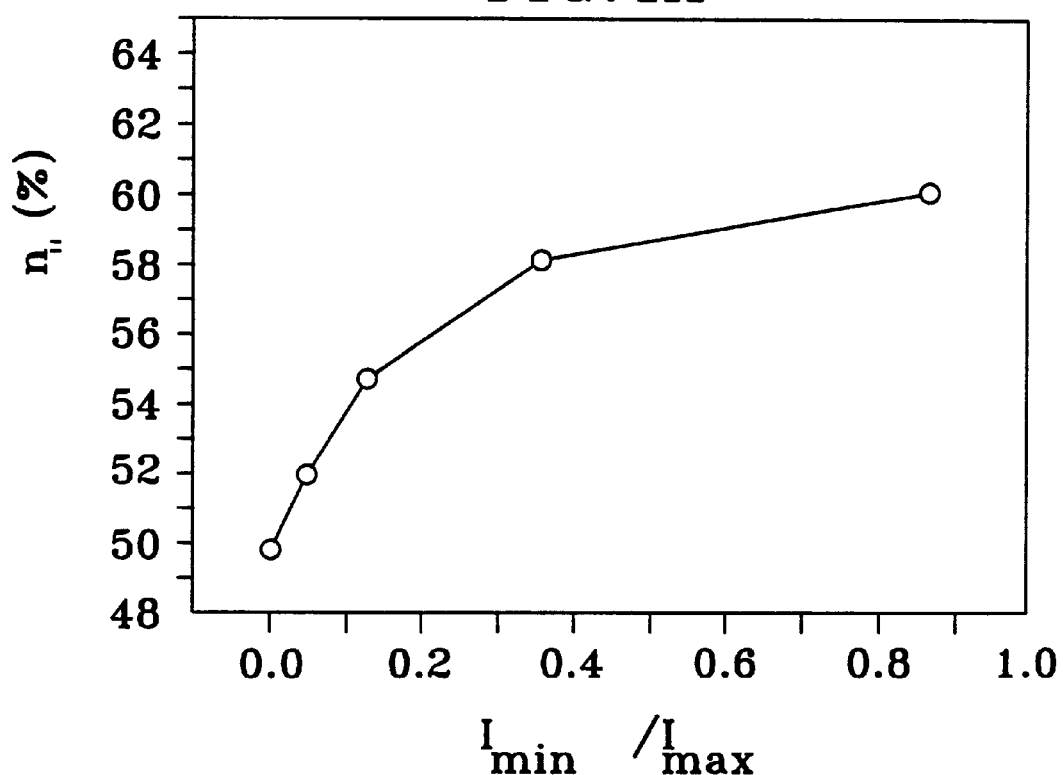
FIG. 4A is a graph showing the number ratio of methyl orange molecules arranged in the parallel direction to the propagation of the pump beam.
Figure 4B:
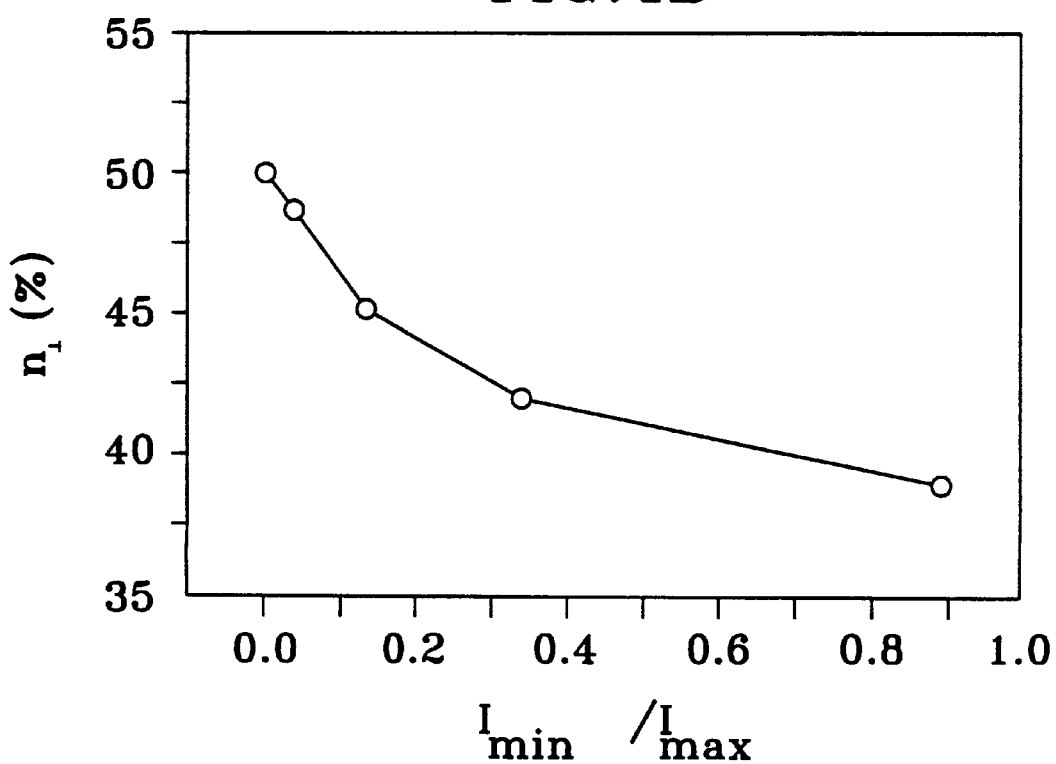
FIG. 4B is a graph showing the number ratio of methyl orange molecules arranged in the perpendicular direction to the propagation of the pump beam.
Figure 4C:
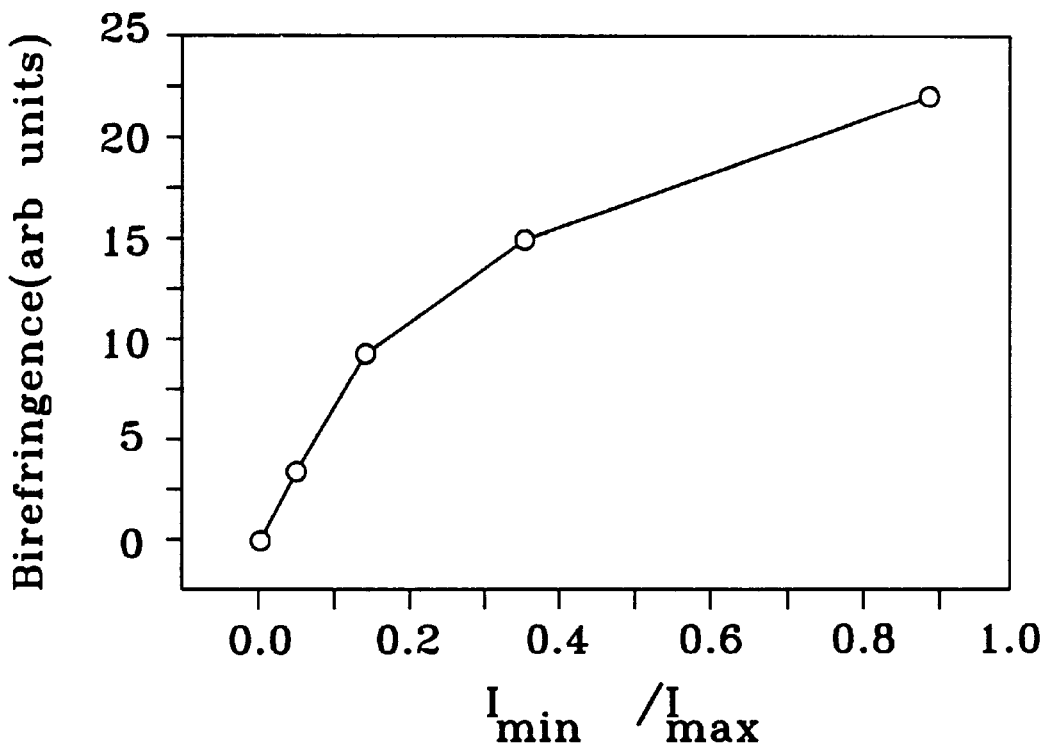
FIG. 4C is a graph showing a birefrigence of methyl orange according to the polarized state of the pump beam.

By measuring the transmittance $T_{\parallel}$ and the transmittance $T_{\perp}$ of the probe beam in accordance with the polarized state of the pump beam, $n_{\parallel}$, $n_{\perp}$ and $\Delta n$ are computed, which are shown in FIGS. 4A to 4C. In FIGS. 4A to 4C, I means the intensity of light transmitted, proportional to square of the electric field of the pump light, $I_{min}$ indicates light intensity at the minor axis of the pump light and $I_{max}$ indicates light intensity at the major axis of the pump light. $I_{min}/I_{max}=0$ corresponds to the linear polarization, $0<I_{min}/I_{max}<1$ corresponds to the ellipse polarization and $I_{min}/I_{max}=1$ corresponds to the circular polarization.

FIGS. 4A to 4C show the arrangement of the methyl orange molecules responsive to the polarization state of the pump beam. FIG. 4A illustrates the number ratio $n_{\parallel}$ of the methyl orange molecules arranged parallel to the propagation direction of the pump beam. As the polarization state approaches the circular polarization, the number ratio $n_{\parallel}$ is exponentially increased.

FIG. 4B illustrates the number ratio $n_{\perp}$ of the methyl orange molecules arranged vertical to the propagation direction of the pump beam. As the polarization state approaches the circular polarization, the number ratio $n_{\perp}$ is exponentially decreased.

FIG. 4C shows the birefrigence $\Delta n$ of the polymer film 21. As the polarization state approaches the circular polarization, the birefrigence $\Delta n$ is exponentially increased.

From the above description, if the polarization state of the pump beam is changed from the linear polarization to the circular polarization, the electric field at the minor axis of the pump beam is increased in amplitude and the increased electric field makes the methyl orange molecules of the polymer aligned-film 21 to be arranged along the propagation of the pump beam.

Figure 5:
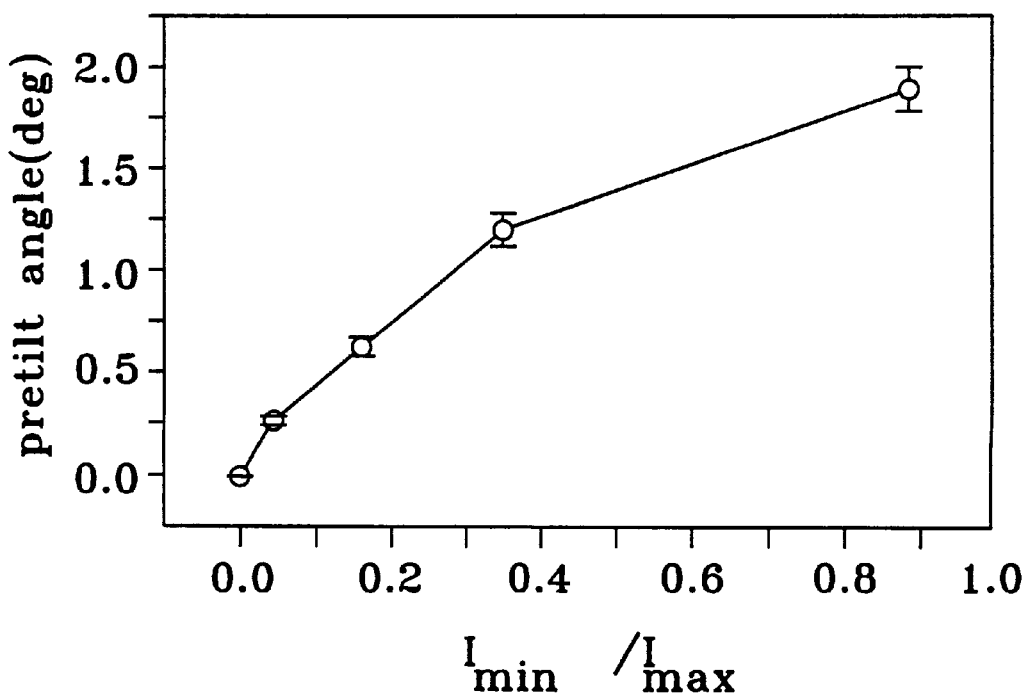
FIG. 5 is a graph showing a pretilt angle of liquid crystal according to the polarized state of the pump beam.

FIG. 5 shows a pretilt angle of the liquid crystal of the cell in FIG. 5, which is measured by the crystal rotation method, according to the polarization state of the pump beam. If the pretilt angle of the cell is measured in the condition that the pretilt angle $\alpha_{PI}$ of the polyimide alignment film 11 is known, the pretilt angle $\alpha$ of the liquid crystal near the polymer aligned-film 21 can be determined. Referring to FIG. 5, as the polarization state of the pump beam advances from the linear polarization to the circular polarization, the pretilt angle $\alpha$, like the birefringence, is exponentially increased.

Figure 6A:
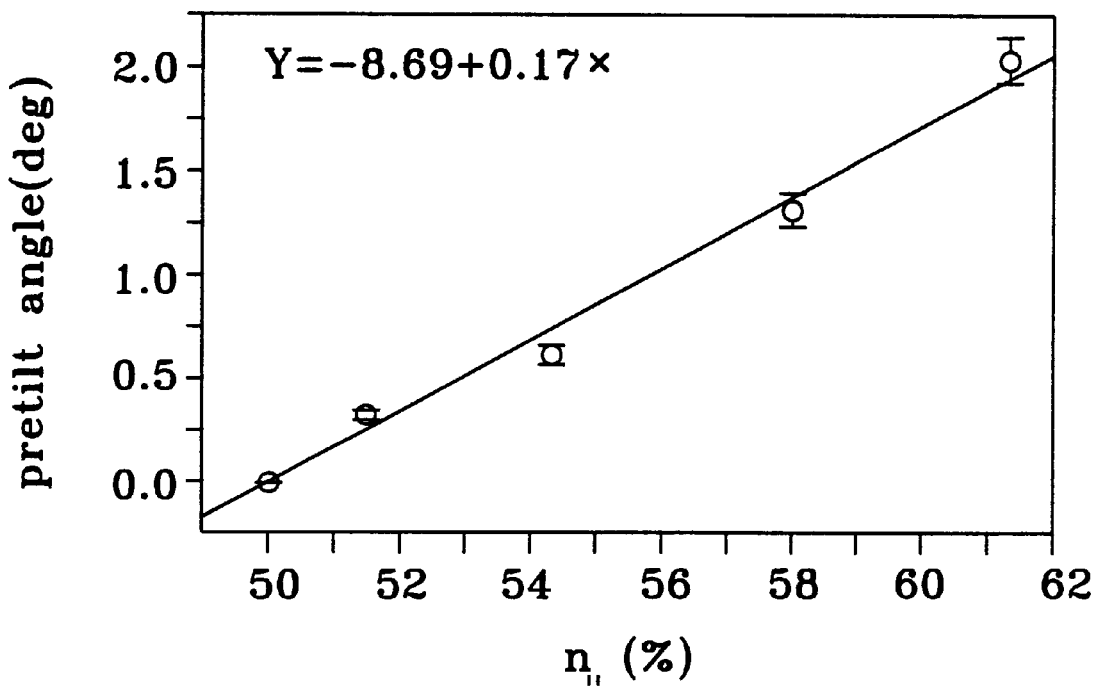
FIG. 6A is a graph showing a pretilt angle of liquid crystal according to the number ratio of methyl orange molecules arranged in the parallel direction to the propagation of the pump beam.
Figure 6B:
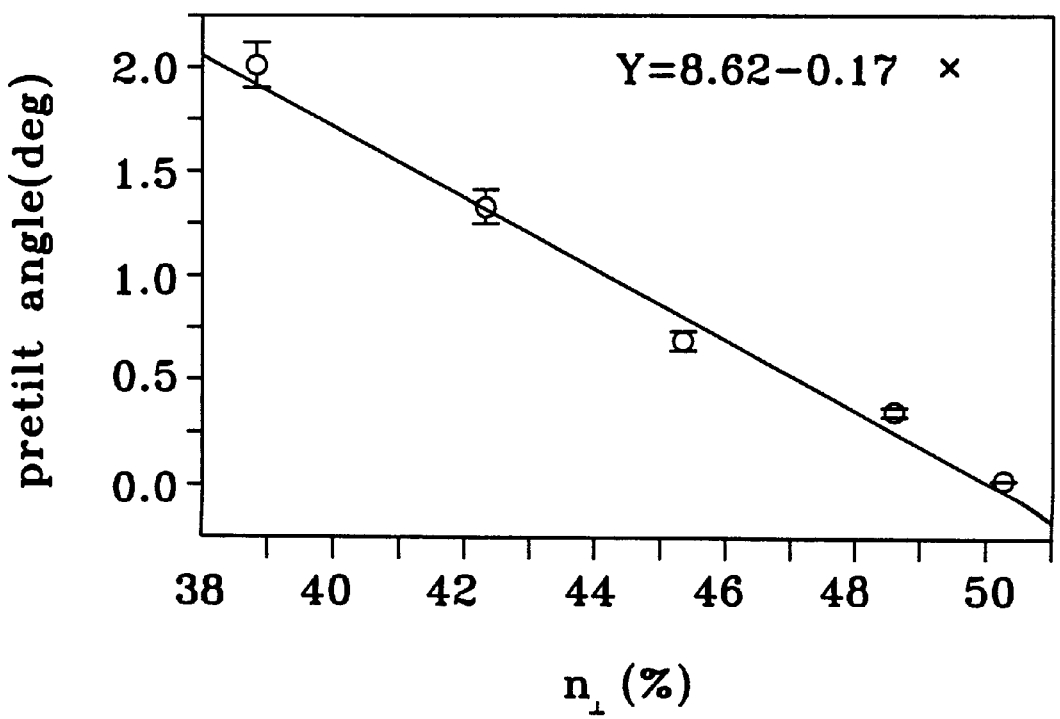
FIG. 6B is a graph showing a pretilt angle of liquid crystal according to the number ratio of methyl orange molecules arranged in the perpendicular direction to the propagation of the pump beam.
Figure 6C:
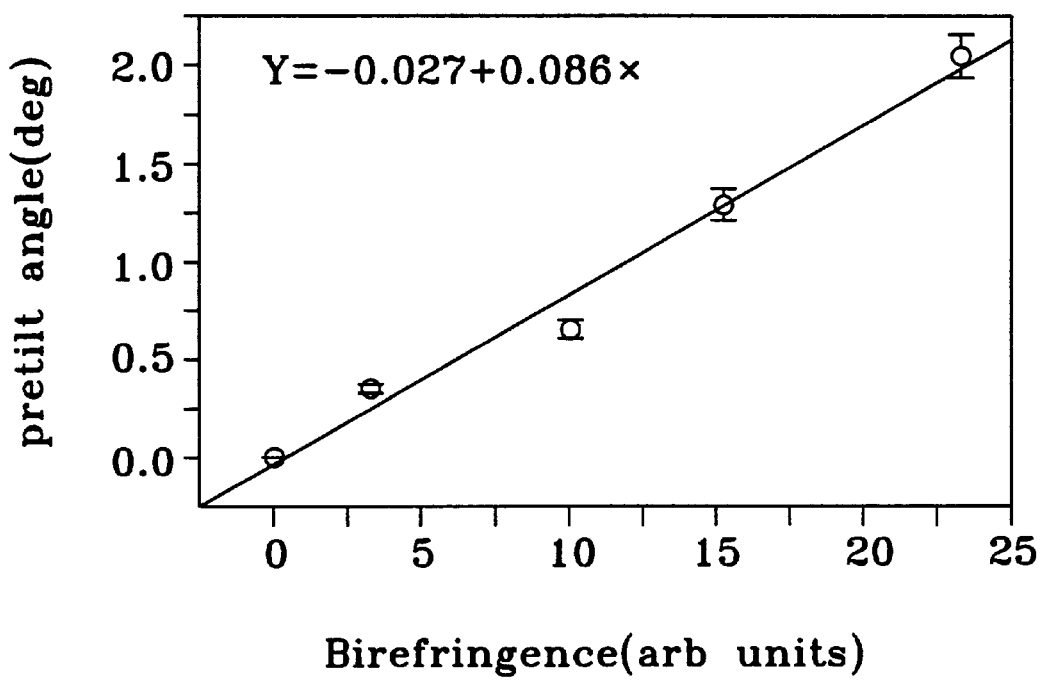
FIG. 6C is a graph showing a pretilt angle of liquid crystal according to the birefrigence of methyl orange.

The pretilt angle variation a according to the $n_{\parallel}$, $n_{\perp}$ and $\Delta n$ of the polymer aligned-film 21 made of the methyl orange/polyvinyl alcohol, is shown in FIGS. 6A to 6C.

As shown in FIG. 6A and FIG. 6B, the pretilt angle $\alpha$ is linearly increased and decreased, respectively, in accordance with the increase of $n_{\parallel}$, $n_{\perp}$. In FIG. 6C, as the birefringence $\Delta n$ is increased, the pretilt angle $\alpha$ is linearly increased.

Therefore, we can conclude that the pretilt angle $\alpha$ is linearly increased as the number of the methyl orange molecules arranged along the propagation of the pump beam increases.

Also, in accordance with the polarization state of the pump beam, that is the electric field intensity of the major axis and the minor axis of the pump beam, the number of the methyl orange molecules arranged along the propagation of the pump beam is changed and thus the pretilt angle $\alpha$ is controlled.

The process for forming multi-domain by using the rubbing method is complicated because the rubbing steps corresponding to the number of domains are required. However, the present invention can easily form the multi-domain just by modifying the incident direction of the pump beam and/or the polarization state of the pump beam.

As the described optical alignment concerning the present invention, the present invention has the following advantages.

First, an alignment film without defect can be achieved because of no rubbing.

Second, the pretilt angle $\alpha$ of the liquid crystal is controlled by the polarization state of the pump beam applied to the polymer including azo-dye, serving the alignment film. Accordingly, the control of the pretilt angle is easy.

Third, the multi-domain can be easily formed without the rubbing method, thus increasing the viewing angle.

Fourth, in case of manufacturing the liquid crystal cell by using the method of the present invention, the damage of the TFT array or color filter owing to the rubbing can be prevented, increasing the production yield and improving the reliability of the production.

What is claimed is:

1. A method for aligning a polymer film, comprising the steps of:

providing a substrate;

forming a polymer film including an azo-dye on said substrate;

applying a pump beam having a predetermined polarization state to said polymer film, modifying an arrangement of molecules of said polymer film, wherein a number of molecules of said polymer film arranged in a first direction parallel to a propagation direction of said pump beam and a number of molecules of said polymer film arranged in a second direction perpendicular to the propagation direction of said pump beam are controlled according to an intensity scale of an electric field of a major axis and an intensity scale of an electric field of a minor axis in said pump beam, and wherein as a ratio between the electric field scale of the major axis and the electric field scale of the minor axis approaches 1, the number of molecules of said polymer film arranged in said first direction increases exponentially.

2. The method as claimed in claim 1, wherein said polymer film is a polyvinyl alcohol including a methyl orange as said azo-dye.

3. The method as claimed in claim 2, wherein said predetermined polarization state is one of a circular polarization, an ellipse polarization and a linear polarization.

4. The method as claimed in claim 1, wherein as said ratio between the electric field scale of the major axis and the electric field scale of the minor axis approaches 1, the number of molecules of said polymer film arranged in said second direction decreases exponentially.

5. The method as claimed in claim 1, wherein a birefringence of said polymer film increases exponentially as said ratio between the electric field scale of the major axis and the electric field scale of the minor axis approaches 1.

6. A method for aligning liquid crystal comprising the steps of:
providing a first substrate;
providing a second substrate opposite said first substrate;
forming a polymer film including an azo-dye on an opposite surface of said first substrate;
applying a pump beam having a predetermined polarization state to said polymer film, modifying an arrangement of molecules of said polymer film, wherein a number of molecules of said polymer film arranged in a first direction parallel to a propagation direction of said pump beam and a number of molecules of said polymer film arranged in a second direction perpendicular to the propagation direction of said pump beam are controlled according to an intensity scale of an electric field of a major axis and an intensity scale of an electric field of a minor axis in said pump beam, and wherein as a ratio between the electric field scale of the major axis and the electric field scale of the minor axis approaches 1, the number of molecules of said polymer film arranged in said first direction increases exponentially; and
forming a liquid crystal layer between said first substrate and said second substrate.

7. The method as claimed in claim 6, wherein said polymer film is a polyvinyl alcohol including a methyl orange as said azo-dye.

8. The method as claimed in claim 6, wherein said predetermined polarization state is one of a circular polarization, an ellipse polarization and a linear polarization.

9. The method as claimed in claim 6, wherein as said ratio between the electric field scale of the major axis and the electric field scale of the minor axis approaches 1, the number of molecules of said polymer film arranged in said second direction exponentially decreases.

10. The method as claimed in claim 6, wherein a birefringence of said polymer film exponentially increases as said ratio between the electric field scale of the major axis and the electric field scale of the minor axis approaches 1.

11. The method as claimed in claim 6, wherein a pretilt angle in a liquid crystal of said liquid crystal layer is controlled according to said polarization state of said pump beam.

12. The method as claimed in claim 11, wherein said pretilt angle in said liquid crystal of said liquid crystal layer increases exponentially as said ratio between the electric field scale of the major axis and the electric field scale of the minor axis approaches 1.

13. The method as claimed in claim 11, wherein said pretilt angle in said liquid crystal of said liquid crystal layer increases exponentially as the number of molecules of said polymer film arranged in said first direction is increased.

14. The method as claimed in claim 11, wherein said pretilt angle in said liquid crystal of said liquid crystal layer decreases exponentially as the number of molecules of said polymer film arranged in said second direction is increased.

15. The method as claimed in claim 11, wherein said pretilt angle in said liquid crystal of said liquid crystal layer increases as a birefringence of said polymer film is increased.

* * * * *